(12) United States Patent
Shiue

(10) Patent No.: US 10,953,576 B2
(45) Date of Patent: Mar. 23, 2021

(54) PROCESS FOR FLEXIBLY MANUFACTURING WETSUIT OR GARMENT BY INTEGRALLY FORMING A FUNCTIONAL SURFACE LAYER ON A RUBBER FOAM SUBSTRATE

(71) Applicant: Min-Chen Shiue, Wujie (TW)

(72) Inventor: Min-Chen Shiue, Wujie (TW)

(73) Assignee: SHEI CHUNG HSIN IND. CO., LTD., Wujei (TW)

( * ) Notice: Subject to any disclaimer, the term of this patent is extended or adjusted under 35 U.S.C. 154(b) by 352 days.

(21) Appl. No.: 15/996,528

(22) Filed: Jun. 4, 2018

(65) Prior Publication Data

US 2019/0366612 A1    Dec. 5, 2019

(51) Int. Cl.
| | |
|---|---|
| *B29C 44/32* | (2006.01) |
| *B29C 43/24* | (2006.01) |
| *B29C 35/02* | (2006.01) |
| *B29C 48/21* | (2019.01) |
| *B29C 48/08* | (2019.01) |
| *B29C 48/00* | (2019.01) |
| *B29C 44/46* | (2006.01) |
| *B29C 44/56* | (2006.01) |
| *A41D 31/00* | (2019.01) |
| *B29L 31/48* | (2006.01) |
| *B29K 105/04* | (2006.01) |
| *B29K 19/00* | (2006.01) |
| *B29K 105/00* | (2006.01) |

(52) U.S. Cl.
CPC ............ *B29C 44/321* (2016.11); *B29C 35/02* (2013.01); *B29C 43/24* (2013.01); *B29C 44/326* (2013.01); *B29C 44/46* (2013.01); *B29C 44/569* (2013.01); *B29C 48/0011* (2019.02); *B29C 48/0012* (2019.02); *B29C 48/022* (2019.02); *B29C 48/08* (2019.02); *B29C 48/21* (2019.02); *B29K 2019/00* (2013.01); *B29K 2105/0032* (2013.01); *B29K 2105/0044* (2013.01); *B29K 2105/04* (2013.01); *B29L 2031/4842* (2013.01)

(58) Field of Classification Search
CPC . B29C 48/21; B29C 48/0011; B29C 48/0012; B29C 47/065; B29C 47/0004; B29C 47/0042
See application file for complete search history.

(56) References Cited

U.S. PATENT DOCUMENTS

| | | | | |
|---|---|---|---|---|
| 4,276,341 A * | 6/1981 | Tanaka | ...................... | B32B 5/26 442/183 |
| 4,825,346 A * | 4/1989 | Schindler | .................. | B32B 7/02 362/311.03 |
| 7,342,190 B2 * | 3/2008 | Burgess | ................. | H01H 3/142 200/61.25 |
| 7,582,352 B2 * | 9/2009 | Kobayashi | ................ | B32B 5/18 428/319.3 |
| 8,393,012 B2 * | 3/2013 | Shiue | ....................... | A43B 5/08 2/2.15 |
| 8,539,612 B2 * | 9/2013 | Shiue | .................. | B29C 65/4815 2/2.15 |
| 8,580,074 B2 * | 11/2013 | Shiue | ..................... | B29C 66/43 156/331.7 |

(Continued)

*Primary Examiner* — Atul P. Khare

(57) ABSTRACT

A process for flexibly making a wetsuit or the like is disclosed by integrally forming a functional surface layer on a rubber foam substrate sheet, thereby rendering the function of the surface layer for the wetsuit or the like.

3 Claims, 1 Drawing Sheet

(56) References Cited

U.S. PATENT DOCUMENTS

| | | | | |
|---|---|---|---|---|
| 8,689,381 B2* | 4/2014 | Shiue | ............... | A43B 5/08 |
| | | | | 12/142 RS |
| 2004/0009324 A1* | 1/2004 | Wu | ............... | B29C 65/5021 |
| | | | | 428/102 |
| 2004/0188006 A1* | 9/2004 | Montagna | ............ | B32B 37/153 |
| | | | | 156/244.16 |
| 2007/0000002 A1* | 1/2007 | Shiue | ............... | B29C 66/72343 |
| | | | | 2/2.15 |
| 2013/0291270 A1* | 11/2013 | Fialko | ............... | B32B 3/266 |
| | | | | 2/2.16 |
| 2016/0157532 A1* | 6/2016 | Shiue | ............... | B29C 66/1142 |
| | | | | 2/2.15 |
| 2016/0200034 A1* | 7/2016 | Quanshan | ............ | B29C 48/002 |
| | | | | 428/141 |

* cited by examiner

PROCESS FOR FLEXIBLY
MANUFACTURING WETSUIT OR
GARMENT BY INTEGRALLY FORMING A
FUNCTIONAL SURFACE LAYER ON A
RUBBER FOAM SUBSTRATE

BACKGROUND OF THE INVENTION

As shown in FIG. 1, a rubber foam product is made by the following steps:
1. Preparing a raw material of rubber foam compound (R);
2. Feeding the rubber foam compound (R) into the extruder E through a hopper (H);
3. Extrusion by the extruder (E) to produce an extruded green rubber foam sheet (P); and
4. Vulcanizing and foaming the extruded green rubber foam sheet (P) to obtain a foam rubber product.

The raw material of rubber foam compound (R) as above-mentioned may include: Chloroprene Rubber (CR), or Natural Rubber (NR), or Styrene-Butadiene Rubber (SBR); carbon black; mineral fillers, foaming agent and other additives. Since the extruded green rubber foam sheet (P) is a conventional rubber foam sheet and appears a black color as blended with carbon black in the compound. When it is intended to make a colorful rubber foam (non-black color), some amount of pigment should be added into the rubber foam compound by blending and dispersing the pigment into the whole compound. However, a colored rubber foam sheet may only appear its color on the surface of the rubber foam sheet.

In other words, there is no need to incorporate those pigments into interior of the rubber foam sheet.

It is, therefore, expected to disclose a rubber foam product by merely providing a colorful surface layer integrally formed on a black colored rubber foam substrate so as to produce versatile colored surface with foam or non-foam rubber sheet.

SUMMARY OF THE INVENTION

The object of the present invention is to provide a process for flexibly making a wetsuit or the like by integrally forming a functional surface layer on a rubber foam substrate, thereby rendering the function of the surface layer for the wetsuit or the like.

Another object of the present invention is to provide a process for flexibly making a wetsuit or the like by integrally forming a colored surface layer on a rubber foam substrate, thereby rendering a colorful function as affected by the surface layer.

DETAILED DESCRIPTION

Figure 2:
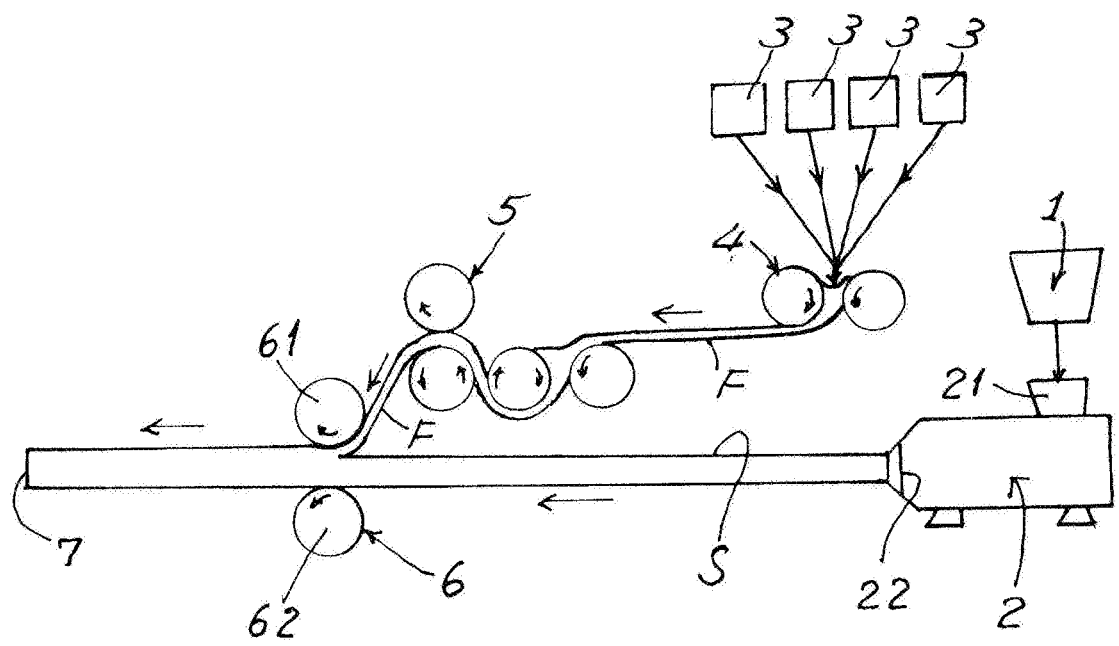
FIG. 2 is a process flow chart showing the production in accordance with the present invention.

As shown in FIG. 2, a green rubber foam compound blended with carbon black in a two-roll mill 1 is fed into a rubber foam sheet extruder 2 through a hopper 21 to produce a rubber foam substrate sheet S as extruded from a die 22 of the extruder 2. At least a green rubber foam stock dispenser 3 is filled with at least a functional surface layer material therein. A two-roll feeding roller set 4 and four-roll calender 5 are mounted above the rubber foam sheet S from the rubber foam sheet extruder 2. The functional surface layer material may include pigment, ultraviolet absorbers (or anti-UV agent), or any other functional additives or agents as blended with synthetic rubber, such as: Chloroprene Rubber (CR), Ethylene Propylene Diene Monomer rubber (EPDM), and Chlorosulfonated Polyethylene rubber (CSM). The formula will be described in detail hereinafter. The functional surface layer material as filled into foam stock dispenser 3 will be downwardly loaded through the 2-roll feeding roller set 4 to deliver a functional surface-layer sheet into the four-roll calender 5 with pre-set gauge (0.3-3 mm, but not limited) of the functional surface-layer sheet F.

The additives, agents and functional ingredients of the functional surface layer material comprises: a pigment, an ultraviolet absorber, an ozone resistant additive, a foaming agent, a promoter, mineral fillers, and other ingredients, or their mixtures. The pigment may be referred as a functional ingredient. Naturally, carbon black may serve as a black pigment.

For example, if it is intended to flexibly make versatile colored rubber foam products, the rollers of calender as shown in FIG. 2 may be respectively fed with different colored rubber compound.

Figure 1:
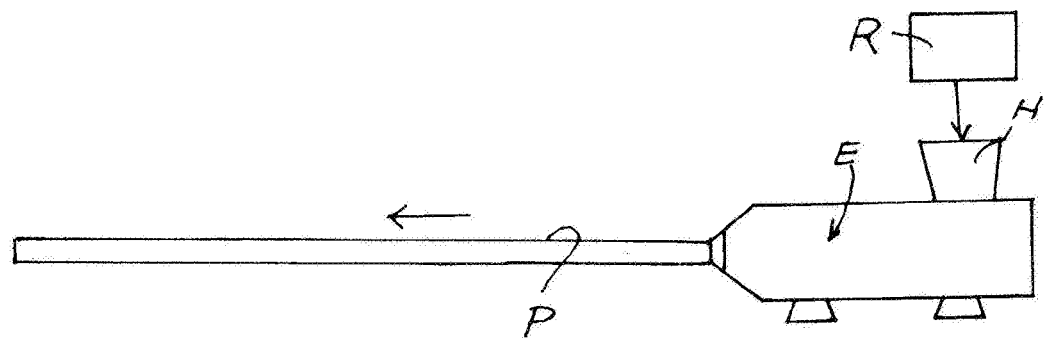
FIG. 1 shows a prior art for making an extruded green rubber foam sheet.

This is very helpful for a flexible manufacturing of the factory production. For example, customer A, who prefers color A, there only green rubber foam stock dispenser 3 for color A is subjected to the production line. Since each functional surface layer sheet F only requires smaller quantity of material in comparison with the thicker substrate sheet S, which requires much more material. Therefore, it is very flexible and economic for the production management. Otherwise, if for making color A product by using the system as shown in FIG. 1, the raw material R for color A must be fed into the extruder E. When it is intended to change as color B product, a whole set of raw material must then be replaced with color B raw material. If the customer order is merely a small order, it may cause difficulties for the production, management and material control.

So, this invention discloses a flexible and economic manufacturing process, just by "modifying", adjusting, manipulating, and controlling the functional surface layer F, without changing the whole set of the foam rubber product including the substrate sheet S.

The functional surface-layer sheet F after calendering is then laminated through pressing roller set 6 as shown in FIG. 2, Furthermore, the thickness of the surface-layer sheet F may be further tuned by adjusting each nip between two adjacent rollers of the calender 5.

Then, the sheet F is driven by the pressing roller set 6 which includes a pair of pressing rollers 61, 62 having the sheet F forwardly driven between the pressing rollers 61, 62. In this step, the pressing roller set 6 may apply pressure and heat in order for thermally bonding the functional surface-layer sheet F with the substrate sheet S which is also driven forwardly by the pressing roller set 6.

Due to pressure and heat applied to the surface-layer sheet F and the substrate sheet S, the surface-layer sheet F and the substrate sheet S are then firmly bonded together to be a composite sheet stock 7.

The composite sheet stock 7 is then performed for vulcanization & foaming to produce a rubber foam composite product, which may be continuously fabricated as a wetsuit or the like. For example, a wetsuit or garments for water sports including diving, surfing, triathlon, fishing, river tracing and other water sports.

The functional surface layer material may contain with or without foaming agent. The ingredients or formula of the functional surface layer material are respectively shown in the following tables:

TABLE 1

Rubber Foam having foaming functional surface layer

| Ingredients | Weight % |
|---|---|
| Synthetic Rubbers (CR, EPDM, CSM) | 45~55 |
| Calcium carbonate | 5~30 |
| Mica powder | 5~30 |
| Zinc oxide | 1~5 |
| Magnesium oxide | 1~4 |
| Foaming agent | 1~8 |
| Promoter | 0.2~0.8 |
| Organic/inorganic pigment, UV absorbers | 0.1~25 |

TABLE 2

Rubber Foam without foaming on surface layer

| Ingredients | Weight % |
|---|---|
| Synthetic Rubber (CR, EPDM, CSM) | 45~55 |
| Calcium carbonate | 5~30 |
| Mica powder | 5~30 |
| Zinc oxide | 1~5 |
| Magnesium oxide | 1~4 |
| Promoter | 0.2~0.8 |
| Organic/inorganic pigment, UV absorbers | 0.1~25 |

Note:
Carbon black may be added therein. The UV absorber may also refer to anti-UV agent.

The finished product of Tables 1 and 2 are respectively tested as follows:

The product of the present invention is also subjected for anti-ozone test according to ASTM 1149 as below mentioned:

The rubber foam specimen is tested in a chamber having ozone concentration of 100 pphm at 40° C. and the specimen is elongated for 30% and tested for 72 hours duration. The tested specimen shows no deformation or corrosion even attacked by ozone, proving this invention to be ozone resistant.

The present invention has the following advantages:
1. It may help a flexible manufacturing for the factory production since a versatility of functional surface layers may be optionally chosen. Each functional surface layer may be added therein with a small amount of functional ingredient, such as color pigment. This is especially helpful for customer-oriented manufacturing.
2. It is more economic for production management and inventory control for saving cost and for preventing waste of materials.
3. It is environmentally friendly since waste material may be minimized.
4. Since the surface layer is so thin (0.3 mm-3 mm), it is easily processed, and the molding or printing pattern or surface design can be easily achieved, directly on the surface layer. Once the surface treatment or decoration is finished, the surface layer is then integrally formed with the substrate sheet of rubber foam. It is easily manipulated or operated (before integrally formed with the substrate sheet), just processing the surface layer, rather than the entire rubber foam product with larger thickness.

The functional surface layer may be incorporated therein with any other suitable ingredients for rendering the expected functions.

TABLE 3

Test data of Table 1 Formula

| Test items | Rubber Foam (Prior Art) | This invention having surface layer of 0.5 mm T | I.P. % | This invention having surface layer 1 mm T | I.P. % | This invention having surface layer 1.5 mm T | I.P. % |
|---|---|---|---|---|---|---|---|
| Tear strength ASTM D624-C, Kg/cm$^2$ | 2.5 | 2.7 | 7.4 | 3.32 | 24.6 | 3.74 | 33.1 |
| Tensile strength ASTM D412-A, Kg/cm$^2$ | 5.5 | 8.5 | 35.3 | 10.11 | 45.5 | 12.74 | 56.8 |

Note:
I.P. % is "Increased Percent, %".
T is thickness.

TABLE 4

Test data of Table 2 Formula

| Test items | Foam Rubber (Prior Art) | This invention having surface layer of 0.5 mm T | I.P. % | This invention having surface layer 1 mm T | I.P. % | This invention having surface layer 1.5 mm T | I.P. % |
|---|---|---|---|---|---|---|---|
| Tear strength ASTM D624-C, Kg/cm$^2$ | 2.5 | 3.0 | 16.6 | 3.4 | 26.4 | 4.1 | 39 |
| Tensile strength ASTM D412-A, Kg/cm$^2$ | 5.5 | 9.02 | 39 | 10.48 | 47.5 | 13.14 | 58.1 |

Note:
I.P. % is "Increased Percent, %".
T is thickness.

The present invention may be further modified without departing from the spirit and scope of this invention.

I claim:

1. A process for flexibly manufacturing a wetsuit, the process comprising:
    preparing a functional surface layer;
    preparing a rubber foam substrate sheet;
    integrally forming said functional surface layer to said rubber foam substrate sheet to obtain a composite sheet; and
    vulcanizing and foaming said composite sheet to produce a rubber foam composite product adapted for making the wetsuit;
    said functional surface layer being pre-formed as a functional foam surface-layer sheet member as extruded through a plurality of rollers and said functional surface-layer sheet member being made of a functional surface layer material which comprises at least a functional ingredient added into a formula for making the functional surface layer.

2. A process according to claim 1, wherein said formula for making said functional surface layer comprises: a synthetic rubber selected from: CR, EPDM, and CSM; calcium carbonate; mica powder; zinc oxide; magnesium oxide; foaming agent; promoter; and said at least one functional ingredient.

3. A process according to claim 1, wherein said at least one functional ingredient is an anti-UV organic or inorganic color pigment.

* * * * *